United States Patent Office 2,972,598
Patented Feb. 21, 1961

2,972,598

ORGANOSILICON SALTS AND PROCESS FOR PRODUCING THE SAME

Edward L. Morehouse, Snyder, N.Y., assignor to Union Carbide Corporation, a corporation of New York No Drawing. Filed Oct. 12, 1956, Ser. No. 615,495

6 Claims. (Cl. 260—46.5)

The present invention relates to organosilicon compounds and to processes for their production. More particularly, this invention is concerned with organosilicon salts containing among other possible functional groups a grouping which has the structural formula:

$$E^{n(-)}[^{(+)}H_3N(CH_2)_aSi\equiv]_n \tag{1}$$

wherein E is an organic or an inorganic anion that has a valence of $(n)$ and $(n)$ is an integer and $(a)$ is an integer that has a value of at least 3 but preferably 3 or 4, as new compositions of matter. The invention is also concerned with processes for producing said organosilicon compounds and with uses thereof.

The present invention is based, in part, upon my discovery that silicon compounds containing a grouping which may be represented by structural Formula 1 can be produced by the reaction of an organosilicon compound containing the aminoalkylsilyl grouping (i.e. a $NH_2(CH_2)_aSi\equiv$ grouping wherein $(a)$ is an integer that has a value of at least 3 and is preferably 3 or 4) with an organic acid or an inorganic acid as represented by the following equation:

$$H_nE + H_2N(CH_2)_aSi\equiv \rightarrow$$
$$E^{n(-)}[^{(+)}H_3N(CH_2)_aSi\equiv]_n \tag{2}$$

wherein E, $(n)$ and $(a)$ have the above-defined meanings.

According to my studies the reaction represented by Equation 2 is a general one and is applicable to all organosilicon compounds which contain the aminoalkylsilyl grouping depicted above. Suitable for use in my process are the aminoalkylalkoxysilanes and the aminoalkylpolysiloxanes, including copolymeric materials which contain both aminoalkylsiloxane and hydrocarbylsiloxane units.

Typical of the aminoalkylalkoxysilanes suitable for use as my organosilicon starting materials are those compounds represented by the structural formula:

$$H_2N(CH_2)_aSiX_{(3-b)}^{R''_b} \tag{3}$$

wherein R'' represents an alkyl group such as the methyl, ethyl propyl and butyl groups and the like, or an aryl group such as the phenyl, naphthyl and tolyl groups and the like or an aralkyl group such as a benzyl group and the like, X represents an alkoxy group such as the methoxy, ethoxy propoxy, and 2-ethyl hexoxy groups and the like, $(a)$ is an integer having a value of at least 3 and preferably a value of from 3 to 4 and $(b)$ is an integer having a value of from 0 to 2 and preferably a value of from 0 to 1. Illustrative of such aminoalkylalkoxysilanes are gamma-aminopropyltriethoxysilane, gamma-aminopropylmethyldiethoxysilane, gamma-aminopropylethyldiethoxysilane, gamma-aminopropylphenyldiethoxysilane, delta-aminobutyltriethoxysilane, delta-aminobutylmethyldiethoxysilane, delta-aminobutylethyldiethoxysilane, delta-aminobutylphenyldiethoxysilane and the like.

Typical of the aminoalkylpolysiloxanes suitable for use as my organosilicon starting materials are those polysiloxanes which contain the structural unit:

$$H_2N(CH_2)_aSiO_{\frac{3-b}{2}}^{R''_b} \tag{4}$$

wherein R'', $(a)$ and $(b)$ have the same values described above. Such polysiloxanes are prepared by the hydrolysis and condensation of those aminoalkylalkoxysilanes described above or by the cohydrolysis and cocondensation of such aminoalkylalkoxysilanes with other hydrolyzable silanes and can include aminoalkylpolysiloxanes of the trifunctional variety (i.e. where $b=0$), aminoalkylalkylpolysiloxanes and aminoalkylarylpolysiloxanes of the difunctional variety which include cyclic or linear polysiloxanes, (i.e. where $b=1$) and linear aminoalkyldialkyldisiloxanes, aminoalkyldiaryldisiloxanes and aminoalkylalkylaryldisiloxanes of the monofunctional variety (i.e. where $b=2$) as well as the mixtures of compounds produced by the cohydrolysis of difunctional and trifunctional aminoalkylalkoxysilanes.

Suitable starting aminoalkylpolysiloxanes of the trifunctional variety can be more specifically depicted as containing the structural unit:

$$H_2N(CH_2)_aSiO_{\frac{3-c}{2}}^{Z_c} \tag{5}$$

wherein $(a)$ has the value previously described, Z represents an hydroxyl or alkoxy group and $(c)$ has an average value of from 0 to 1 or as high as 2 but preferably from 0.1 to 1.0. Aminoalkylpolysiloxanes of this variety which are essentially free of silicon-bonded alkoxy or hydroxyl groups (i.e. where $c=0$) can be prepared by the complete hydrolysis and complete condensation of aminoalkyltrialkoxysilanes, whereas aminoalkylpolysiloxanes which contain silicon-bonded alkoxy groups can be prepared by the partial hydrolysis and complete condensation of the same starting silanes. On the other hand, aminoalkylpolysiloxanes which contain silicon-bonded hydroxyl groups can be prepared by the complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzate so formed to produce the desired polymer.

Suitable starting aminoalkylpolysiloxanes of the difunctional variety which include cyclic and linear polysiloxanes can be more specifically defined by the structural formula:

$$\left[H_2N(CH_2)_aSiO\right]_d^{R''} \tag{6}$$

wherein R'' and $(a)$ have the values previously described and $(d)$ is an integer having a value of at least 3 and can be as high as 7 for the cyclic aminoalkylpolysiloxanes and higher for the linear aminoalkylpolysiloxanes. Such cyclic and linear aminoalkylpolysiloxanes can be prepared by the hydrolysis and condensation of aminoalkylalkyldiethoxysilanes or aminoalkylaryldiethoxysilanes. In carrying out the hydrolysis and condensation procedures there is produced a product comprising a mixture of cyclic and linear polysiloxanes from which the desired polysiloxane can be recovered. Illustrative of the cyclic aminoalkylsiloxanes suitable for use as the organosilicon starting material in my process are the cyclic tetramer of gamma-aminopropylmethylsiloxane, the cyclic tetramer of delta-aminobutylphenylsiloxane and the like. Illustrative of linear aminoalkylpolysiloxanes suitable for use as the organosilicon starting material in my process are gamma-amino propylmethylpolysiloxane, gamma-aminopropylethylpolysiloxane, delta-aminobutylmethylpolysiloxane and the like.

Included among the linear aminoalkylpolysiloxanes suitable for use as the organosilicon starting material in my process are the alkyl, alkoxy and hydroxyl end-blocked polysiloxanes which contain from 1 to 3 of such groups bonded to the terminal silicon atoms of the molecules comprising the polymeric chains. Thus we can also employ as our starting materials such linear end-blocked aminoalkylpolysiloxanes as monoethoxy end-blocked gamma-aminopropylethylpolysiloxane or methyldiethoxysilyl end-blocked delta-aminobutylmethylpolysiloxane or monoethoxydimethylsilyl end-blocked gamma-amino propylphenylpolysiloxane and the like. The end-blocked linear aminoalkylalkylpolysiloxanes and aminoalkylarylpolysiloxanes useful in my process can be prepared by the equilibration of cyclic aminoalkylsiloxanes with silicon compounds containing predominantly silicon-bonded alkoxy groups, or by the cohydrolysis and condensation of trialkylalkoxysilanes with aminoalkylalkyldiethoxysilanes or aminoalkylaryldiethoxysilanes. Hydroxyl end-blocked linear polysiloxanes can also be prepared by heating linear or cyclic aminoalkylpolysiloxanes with water.

The copolymeric aminoalkylpolysiloxanes which can be employed as a starting material can be depicted as containing both the structural units:

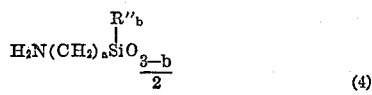

(4)

and

(7)

wherein $R''$, $(a)$ and $(b)$ have the values described above and $(e)$ is an integer having a value of from 0 to 2. The copolymers suitable for use as the organosilicon starting material in my process can contain various combined siloxane units such as trifunctional aminoalkylsiloxane units (where $b=0$) with trifunctional alkyl-, aryl- or mixed alkyl- and arylsiloxane units (where $e=0$) or with difunctional alkyl-, aryl- or mixed alkyl- and arylsiloxane units (where $e=1$). These copolymers can also contain various combined siloxane units: difunctional aminoalkylsiloxane units (where $b=1$) with trifunctional alkyl-, aryl- or mixed alkyl- and arylsiloxane units (where $e=0$) or with difunctional alkyl-, aryl, or mixed alkyl- and arylsiloxane units (where $e=1$).

Those copolymers which contain trifunctional aminoalkylsiloxane units and other siloxane units are preferably prepared by the cohydrolysis and cocondensation of the corresponding alkoxysilane starting materials. Such copolymers can contain silicon-bonded alkoxy or hydroxyl groups or they can comprise essentially completely condensed materials. The linear and cyclic copolymeric siloxanes are preferably prepared by the separate hydrolysis and condensation of an aminoalkylalkyldialkoxysilane or aminoalkylaryldialkoxysilane and the dialkyldialkoxysilane or diaryldialkoxysilane to cyclic aminoalkylsiloxanes and cyclic dialkylsiloxanes or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups.

The aminoalkylalkoxysilanes and aminoalkylpolysiloxanes as well as copolymers containing aminoalkylsiloxane and hydrocarbylsiloxane units are all disclosed and claimed as new compositions of matter in copending U.S. applications Serial Nos. 615,466; 615,483; and 615,507, filed concurrently herewith. Processes for producing such compounds are also disclosed and claimed in said copending applications.

I have found that the reaction represented by Equation 2 is generally applicable to all organic acids and inorganic acids. These acids may be represented by the structural formula:

$$H_nE \qquad (8)$$

wherein $(n)$ and E have the above-defined meanings. The acids that are useful as starting materials in producing the compounds of the invention are depicted more specifically in structural Formulae 9 and 10 below Typical of the organic acids that are useful as starting materials in producing the compounds of this invention are the compounds represented by the structural formula:

$$H_nE' \qquad (9)$$

wherein E' is an organic anion that has a valence of $(n)$ and $(n)$ is an integer. The organic anion represented by E' may be substituted or unsubstituted and, when substituted, the substituents may be amino, nitro, carboalkoxy, carboaryloxy, cyano, hydrocarbylthio (e.g. methylthio, $CH_3S-$) or mercapto groups or halogen atoms. Illustrative of the organic acids represented by structural Formula 9 are formic acid, such monocarboxylic alkanoic acids as trichloroacetic acid, acetic acid, glycolic acid, propionic acid, ethoxy propionic acid, stearic acid and the like, monocarboxylic alkenoic acids such as acrylic acid, methacrylic acid, oleic acid, crotonic acid and the like, oxalic acid, saturated dicarboxylic aliphatic acids such as malonic acid, succinic acid, adipic acid, sebacic acid and the like, olefinically unsaturated dicarboxylic acids such as maleic acid, fumaric acid, 1-decene, 1,10-dicarboxylic acid and the like, the aryl carboxylic acids such as benzoic acid, the isomeric toluic acids, para-aminobenzoic acid, p-nitrobenzoic acid, the isomeric phthalic acids (i.e. ortho-, meta-, and para-phthalic acids), the isomeric naphthoic acids and the like and phenols such as phenol and substituted phenols such as pentachlorophenol, picric acid and the like, such carboxylic acids that contain a cyclic and bridged structure as chlorendic acid and the like, such carboxyl substituted heterocyclic ring compounds (wherein the heterocyclic ring contains carbon and oxygen, nitrogen and/or sulfur atoms) as nicotonic acid, 2-carboxypyrrole, 2-carboxyfuran, 2-carboxythiophene, 2-carboxygloxaline and the thiazole, 3-carboxypyrazole, 2-carboxyglyoxaline and the like, alkyl and aryl sulfonic and phosphonic acids such as benzene sulfonic acid and benzene phosphonic acid and such organo sulfonic acids as the alkyl sulfuric acids including methyl sulfuric acid, ethyl sulfuric acid, propyl sulfuric acid and the like as well as the aryl sulfonic acids including benzene sulfonic acid, the isomeric naphthylene sulfonic acids, 2,4-dihydroxy benzophenone-4'-sulfonic acid and the like. The organic acids that I prefer to use as starting materials are monocarboxylic alkanoic acids that contain from 1 to 12 or as high as 20 carbon atoms per molecule, acids that contain a monocarboxy or dicarboxy substituted benzene ring, monocarboxylic alkenoic acids that contatin from 3 to 10 or as high as 20 carbon atoms per molecule, saturated dicarboxylic aliphatic acids that contain from 3 to 10 or as high as 20 carbon atoms per molecule, olefinically unsaturated dicarboxylic acids that contain from 4 to 10 or as high as 20 carbon atoms per molecule, phenols, benzene sulfonic acids and naphthalene sulfonic acids.

Typical of the inorganic acids that are useful as starting materials in producing the compounds of the invention are the compounds represented by the structural formula:

$$H_nE'' \qquad (10)$$

wherein E'' is an inorganic anion that has a valence of $(n)$ and $(n)$ is an integer. Illustrative of the inorganic acids represented by structural Formula 10 are hydrofluoric acid, hydrochloric acid, hydroiodic acid, sulfuric acid, phosphoric acid, boric acid, carbonic acid, arsenic acid, nitric acid and the like. The inorganic acids that I prefer to use as starting materials are hydrochloric acid, sulfuric acid, carbonic acid, boric acid and phosphoric acid.

The process of my invention can be carried out by forming a mixture of an organosilicon compound containing the aminoalkylsilyl grouping depicted above with an organic or an inorganic acid and maintaining the mixture at a temperature at which the organosilicon compound and the acid react to produce an organosilicon salt that contains the grouping represented by structural Formula 1.

The relative amounts of the organosilicon compounds containing the aminoalkylsilyl grouping and the organic and inorganic acid used as starting materials in my process are not narrowly critical. I can employ for each gram atom of nitrogen present in the aminoalkylsilyl group or groups of my starting organosilicon compound from 0 to 1 chemical equivalents (based on the basicity of the acid starting material, i.e. the valence $(n)$ of the anion) of the starting acid. However, I prefer to employ for each gram atom of nitrogen present in the aminoalkylsilyl group or groups of my starting organosilicon compound from 0.5 to 1 chemical equivalents (based on the basicity of the acid starting material i.e. the valence $(n)$ of the anion of the starting acid) of the starting acid. More than one equivalent of the starting acid per gram atom of nitrogen in the aminoalkylsilyl group or groups of my starting organosilicon compound may be used but are not usually desirable because side reactions (such as amide formation when carboxylic acids are used as starting materials) occur when such amounts of the acid is used.

The reaction between my starting compounds can be carried out at temperatures which are not narrowly critical and which can vary over a wide range. I can employ temperatures of from as low as $-20°$ C. to temperatures as high as $100°$ C. However, I prefer to conduct the reaction at temperatures of from about $25°$ C. to about $50°$ C. provided that the reactants are miscible or that the reactants are dissolved in a liquid organic compound at these preferred temperatures.

The reaction between organosilicon compounds containing the aminoalkylsilyl grouping and the acids are preferably carried out with a liquid organic compound in which the starting materials are mutually soluble and which is non-reactive therewith. Illustrative of such liquid organic compounds are ethanol, toluene, diethyl ether and the like.

The amount of the liquid organic compound within which the reaction can be carried out is not narrowly critical. I can employ such liquid organic compounds in amounts of from about 10 parts to about 500 parts by weight per 100 parts by weight of the organosilicon and acids starting materials. Amounts of such liquid organic compounds of from 50 parts to 200 parts by weight per 100 parts by weight of the organosilicon and acid starting materials are preferred in conducting the reaction. Amounts of these liquid organic compounds other than those described above may be used; however, no commensurate advantage is gained thereby.

The compounds of this invention are organosilicon compounds that contain a grouping which has the structural formula:

$$E^{n(-)}[^{(+)}H_3N(CH_2)_aSi\equiv]_n$$

wherein E is an organic or an inorganic anion that has a valence of $(n)$ and $(n)$ is an integer and $(a)$ is an integer that has a value of at least 3 but preferably 3 or 4, as new compositions of matter. E may represent the above-defined E' and E''.

The compounds of this invention that are produced from the aminoalkylalkoxysilanes that are represented by structural Formula 3 and the organic and inorganic acids represented by Formula 8 are organo-silicon salts that may be represented by the structural formula:

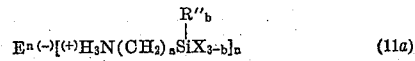
(11a)

wherein E, $(n)$, $(a)$, R'', X and $(b)$ have the above-described meanings. Illustrative of these organosilicon salts are the hydrochloride salt of gamma-aminopropyltriethoxysilane, the acetic acid salt of delta-aminobutylmethyldiethoxysilane, the benzene sulfonic acid salt of delta-aminobutyldimethylethoxysilane and the like.

The aminoalkylalkoxysilanes that are represented by structural Formula 11a may be depicted more specifically below. When organic acids and aminoalkylalkoxysilanes containing the aminoalkylsilyl grouping are used as starting materials in my process, the compounds of my invention may be represented by the structural formula:

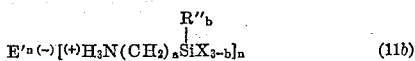
(11b)

wherein E', $(n)$, $(a)$, R'', X and $(b)$ have the above-described meanings. When inorganic acids and aminoalkylalkoxysilanes containing the aminoalkylsilyl grouping are used as starting materials in my process, the compounds of my invention may be represented by the structural formula:

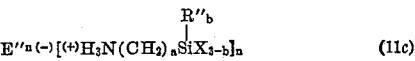
(11c)

wherein E'', $(n)$, $(a)$, R'', X and $(b)$ have the above-described meanings.

The compounds of this invention that are produced from the aminoalkylpolysiloxanes that contain the structural units represented by structural Formula 4 and the organic and inorganic acids represented by Formula 8 are organosilicon salts that contain the structural unit that may be represented by the structural formula:

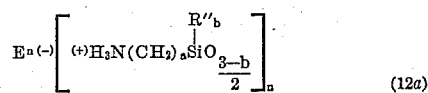
(12a)

wherein E, $(n)$, $(a)$, R'' and $(b)$ have the above-described meanings. Illustrative of these units are those derived from hydrochloric acid and the gamma-aminopropylsiloxy unit, those derived from acetic acid and the delta-aminobutylmethylsiloxy unit, those derived from benzene sulfuric acid and the delta-aminobutyldimethylsiloxy unit and the like.

The compounds of this invention that are produced from aminoalkylpolysiloxanes that contain combined units that are represented by structural Formula 4 and organic and inorganic acids may be combined groups that may be more specifically depicted by the following structural formulae. Compounds of this invention that are produced from aminoalkylpolysiloxanes that contain combined units that are represented by structural Formula 4 and organic acids contain combined groups that may be represented by the structural formula:

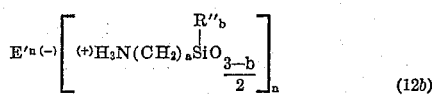
(12b)

wherein E', $(n)$, $(a)$, R'' and $(b)$ have the above-described meanings. The compounds of this invention that are produced from aminoalkylpolysiloxanes that contain combined units that are represented by structural Formula 4 and inorganic acids contain combined units that may be represented by the structural formula:

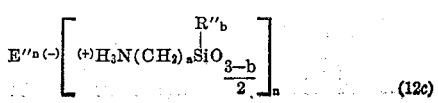
(12c)

wherein E", (n), (a), R" and (b) have the above-described meanings.

The compounds of this invention that are produced from the aminoalkylpolysiloxanes that contain the structural unit represented by structural Formula 5 and the organic acids, and inorganic acids represented by Formula 8 are organosilicon salts that contain the structural unit that may be represented by the structural formula:

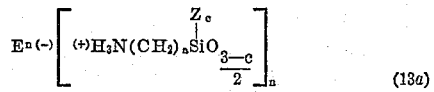
(13a)

wherein E, (n), (a), Z and (c) have the above-described meanings. Illustrative of these units are those derived from hydrochloric acid and the gamma-aminopropylhydroxysiloxy unit, those derived from acetic acid and the delta-aminobutylhydroxysiloxy unit, those derived from the benzene sulfuric acid and the delta-aminobutylethoxyphenylsiloxy unit and the like.

The structural unit that is represented by the structural unit (13a) which is present are compounds of this invention is more specifically depicted below. When aminoalkylpolysiloxanes that contain the structural units represented by structural Formula 5 and organic acids are used as starting materials in my process, the compounds produced contain combined units that may be represented by the structural formula:

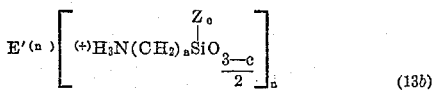
(13b)

wherein E' (n), (a), Z and (c) have the above-described meanings. When aminoalkylpolysiloxanes that contain the structural unit represented by structural Formula 5 and inorganic acids are used as starting materials in my process, the compounds produced contain the structural unit that may be represented by the structural formula:

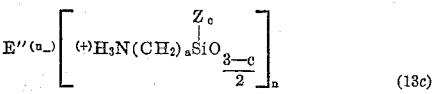
(13c)

wherein E', (n), (a), Z and (c) have the above-described scribed meanings.

The compounds of this invention that are produced from the copolymeric aminoalkylpolysiloxanes that contain the structural units represented by structural Formulae 4 and 7 and the acids represented by Formula 8 are salts of copolymeric aminoalkylpolysiloxanes that contain the structural Formulae 7 and 12a. These compounds of this invention may be more specifically described as containing combined units that are represented by structural Formulae 7 and 12b or 7 and 12c.

Salts of this invention produced from aminoalkylalkoxysilanes and acids were found to be good emulsifying agents in systems containing water and a water-immiscible liquid organic compound such as benzene.

Organopolysiloxanes which contain combined aminoalkylsiloxane units, which units have been reacted according to the process of this invention to produce salts, as well as other combined siloxane units were found to possess properties that were superior to organopolysiloxanes that did not contain such aminoalkylsiloxane units. By way of illustration organopolysiloxane oils that contain combined aminoalkylsiloxane units, which have been converted to salts according to the process of this invention, and combined dimethylsiloxane units were found to be more viscous and hence more useful in many applications than organopolysiloxane oils that contain only dimethylsiloxane units. As a further illustration, organopolysiloxane gums that contain combined aminoalkylsiloxane units, which units have been reacted according to the process of this invention to produce salts, and combined dimethylsiloxane units can be converted to fairly rigid elastomers and resins. Organopolysiloxane gums that contain only combined dimethylsiloxane units can also be converted to elastomers but these elastomers are generally less rigid than the elastomers produced as described above. In addition, organopolysiloxane gums that contain only combined dimethylsiloxane units are not readily converted to resins.

The following examples are illustrative of my invention:

Example I

To a 100 cc. flask was added delta-aminobutylmethylsiloxane cyclic tetramer (i.e. $[NH_2(CH_2)_4Si(CH_3)O]_4$). The flask was immersed in a water-ice bath and concentrated hydrochloric acid added dropwise to the flask until the mixture was acid. Water and excess acid were removed from the flask by volatilization at 25° C. at reduced pressure. The product was the hydrogen chloride salt of the tetramer (i.e. $[Cl^{(-)(+)}H_3N(CH_2)_4Si(CH_3)O]_4$)

which was a brittle, white solid that had a melting range of 235-255° C. It was soluble in water and insoluble in ethanol. Analysis of the salt gave the following data:

Calculated for $[C_5H_{14}SiNClO]_4$ (percent by wt.): Si, 16.7; N, 8.4; Cl, 21.2. Found (percent by wt.): Si, 16.6; N, 8.1; Cl, 21.3.

Example II

To a test tube were added two grams of a gum that consisted of a copolymer that contained 10 parts by weight of combined delta-aminobutylmethylsiloxane units and 90 parts by weight of combined dimethylsiloxane units per 100 parts by weight of the copolymer. The gum was dissolved in absolute ethanol (15 cc.). To three separate test tubes was added one gram each of boric acid, adipic acid and cupric acetate monohydrate. Absolute ethanol (10 cc.) was then added to each of the three test tubes to form three separate alcohol solutions of each acid. Then in turn the solution of each compound was poured into a separate solution of the gum. The copper product so produced was blue and insoluble in the ethanol. Both the boric and adipic acids formed compounds soluble in the ethanol. The copper product was separated and washed by decantation, then air-dried at room temperature. The other two products were poured onto a watch glass and the solvent allowed to evaporate at room temperature.

The boric acid product was a copolymer that contained combined units of the type

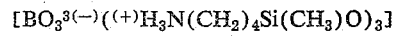

and combined dimethylsiloxane units. It was a colorless, transparent tough elastic film that had very good tensile strength. It was soluble in ethanol.

The adipic acid product was a copolymer that contained combined units of the type

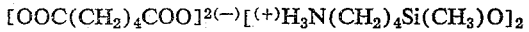

and combined dimethylsiloxane units. It was a white elastic material with a lower tensile strength than the boric acid product.

The cupric acetate product was a copolymer that contained units of the type

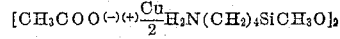

and combined dimethylsiloxane units. It was an intensely blue solid with elastomeric properties. This was tougher than a similar product made from a gum that consisted of a copolymer that contained 1 part by weight of combined delta-aminobutylmethylsiloxane units and 99 parts by weight of combined dimethylsiloxane units per 100 parts by weight of the copolymer.

Example III

To a 30 cc. beaker was added delta-aminobutylmethyldiethoxysilane (5.0 grams; 0.024 mole). The beaker was immersed in a water-ice bath and oleic acid (6.9 grams, 0.024 mole) stirred into the silane. The product (I) so formed was the oleic acid salt of the silane

[i.e. CH$_3$(CH$_2$)$_7$CH=CH(CH$_2$)$_7$COO$^{(-)(+)}$H$_3$N(CH$_2$)$_4$
—Si(CH$_3$)(OC$_2$H$_5$)$_2$]

and it was a yellow liquid. To another 30 cc. beaker was added a mixture of cyclic delta-aminobutylmethylsiloxanes that had at least three combined delta-aminobutylmethylsiloxane units per molecule (5.0 grams, 0.038 mole). This beaker was also immersed in a water-ice bath and oleic acid (10.8 grams, 0.038 mole) was stirred into the silicone. This product (II) was a mixture of cyclic siloxanes that contained at least three combined units that may be represented by the structural formula:

[CH$_3$(CH$_2$)$_7$CH=CH(CH$_2$)$_7$COO$^{(-)(+)}$
H$_3$N(CH$_2$)$_4$Si(CH$_3$)O]

per molecule and it was a yellow, gummy solid. Each of these products (I and II) was tested as an emulsifier by the following procedure: Each compound (0.2–0.3 gram) was shaken with water (10 cc.) and benzene (5 cc.) added and the shaking continued vigorously for several minutes. Stable benzene in water emulsions were formed in both cases.

*Example IV*

To a 500 cc. flask was added gamma-aminopropyltriethoxysilane (55.3 grams, 0.25 mole). The flask was immersed in a water-ice bath and 50 cc. of water were added to the flask. The pH of the resultant homogeneous liquid was 11.4. Without cooling the flask, carbon dioxide (a large excess over that amount needed to form the normal salt was used) was passed into the silane. There was an exothermic reaction. The product so produced was a pale pink liquid. The pH of the pale pink liquid was 9.0. The pale pink liquid was stripped at room temperature and lower at reduced pressure. The residue so produced was a pale pink brittle solid that had the following analysis:

Calculated for C$_7$H$_{18}$Si$_2$N$_2$O$_6$ (percent by wt.): CO$_3$, 21.1; O, 34.1; C, 29.8; H, 6.4; Si, 19.8; N, 9.9. Found (percent by wt.): CO$_3$, 19.1; C, 27.7; H, 6.4; Si, 17.8; N, 7.3.

The infra-red analysis of the residue showed the presence of the following groups: SiO$_{1.5}$ and CO$_3$$^=$ and the absence of the following groups: SiOH and SiOC$_2$H$_5$.

The pale pink solid was a siloxane homopolymer that contained combined units that may be represented by the structural formula:

CO$_3$$^{2(-)}$[$^{(+)}$H$_3$N(CH$_2$)$_3$SiO$_{1.5}$]$_2$

*Example V*

Three drops of concentrated sulfuric acid were added at 25–35° C. to 10 grams of a copolymer that contained 10 parts by weight of combined gamma-aminopropylmethylsiloxane units and 90 parts by weight of combined dimethylsiloxane units per 100 parts by weight of the copolymer. The copolymer was a silicone oil that had a molecular weight of 10,000. Each drop of the concentrated sulfuric acid contained 0.00254 equivalent of the acid. A turbid colorless very viscous oil was produced. This oil set to form a gum when allowed to stand for 6 days at room temperature. The salt produced in this example contained combined units that are represented by the structural formula:

CH$_3$
|
SO$_4$$^{2(-)}$[$^{(+)}$H$_3$N(CH$_2$)$_3$SiO]$_2$

*Example VI*

Three drops of concentrated sulfuric acid were added at 25–35° C. to 10 grams of a copolymer that contained 10 parts by weight of combined gamma-aminopropylmethylsiloxane units and 90 parts by weight of combined dimethylsiloxane units per 100 parts by weight of the copolymer. The copolymer was a silicone oil that had a molecular weight of 1000. A turbid colorless oil was produced. This oil set to form a gum when allowed to stand for 6 days at room temperature. The salt produced in this example contained combined units that are represented by the structural formula:

CH$_3$
|
SO$_4$$^{2(-)}$[$^{(+)}$H$_3$N(CH$_2$)$_3$SiO]$_2$

*Example VII*

Sixty-three drops of ethoxypropionic acid were added to 25 grams of a copolymer that contained 25 parts by weight of combined delta-aminobutylmethylsiloxane units and 75 parts by weight of combined dimethylsiloxane units per 100 parts by weight of the copolymer. The copolymer was a silicone oil that had a molecular weight of 5000. Each drop of the ethoxypropionic acid contained 0.000158 equivalent of the acid. An exothermic reaction took place at 25–35° C. when the acid was added to the copolymer and a viscous turbid yellow oil was produced. The oil so produced was a salt that contained combined dimethylsiloxane units and combined units that may be represented by the structural formula:

$$\text{C}_2\text{H}_5\text{O}(\text{CH}_2)_2\overset{\text{O}}{\underset{\|}{\text{C}}}\text{O}^{(-)}[^{(+)}\text{H}_3\text{N}(\text{CH}_2)_4\overset{\text{CH}_3}{\underset{|}{\text{Si}}}\text{O}]$$

*Example VIII*

Seventy-four one-hundredths gram of chlorendic acid was added at 25° C. to 10 grams of a copolymer that contained 5 parts by weight of combined delta-aminobutylmethylsiloxane units and 95 parts by weight of combined dimethylsiloxane units per 100 parts by weight of the copolymer. The copolymer was a silicone oil that had a molecular weight of 5000. The mixture so formed was heated and stirred on a steam bath. A very viscous liquid was formed. The liquid so formed was the chlorendic acid salt of the copolymer.

*Example IX*

Two grams of a copolymer that contained 10 parts by weight of combined delta-aminobutylmethylsiloxane units and 90 parts by weight of combined dimethylsiloxane units per 100 parts by weight of the copolymer were dissolved in 8 milliliters of absolute ethanol. The copolymer was a silicone oil that had a molecular weight of 30,000. Two-tenths gram of phosphoric acid was then added to the solution so formed. The addition was performed at 25–30° C. A white, rubbery product was formed. The product so formed softened at 120–130° C. and it was a salt that contained combined dimethylsiloxane units and combined units that may be represented by the structural formula:

CH$_3$
|
PO$_4$$^{3(-)}$[H$_3$N(CH$_2$)$_4$SiO]$_3$

*Example X*

Five grams of a copolymer that contained 1 part by weight of combined delta-aminobutylmethylsiloxane units and 99 parts by weight of combined dimethylsiloxane units per 100 parts by weight of the copolymer were dissolved in 20 milliliters of toluene. The copolymer was a gum that had a miniature penetrometer reading of 38. Three milliliters of the solution so formed were placed in a test tube along with 5 milliliters of absolute ethanol. The contents of the test tube were added to 1 ml. of a saturated solution of cupric acetate monohydrate. The addition was performed at 25° C. A solid was formed and was separated by decanting the liquid. The solid was then washed with ethanol and was found to be a blue elastomer. The solid so produced was a salt of the silicone copolymer that contained the units:

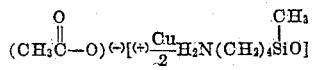

Example XI

Five grams of a copolymer that contained 1 part by weight of combined delta-aminobutylmethylsiloxane units and 99 parts by weight of combined dimethylsiloxane units per 100 parts by weight of the copolymer were dissolved in 20 milliliters of toluene. The copolymer was a gum that had a miniature penetrometer reading of 38. Three milliliters of the solution so formed were placed in a test tube along with 5 milliliters of absolute ethanol. Three ml. of a saturated solution of boric acid in ethanol were added to the test tube and a solid formed when the contents of the test tube were thereupon stirred. The addition was performed at 25° C. The solid was separated from the liquid in the test tube by decanting the liquid and then the solid was washed with ethanol. The solid so produced was an elastomer. The solid was a salt of the silicone copolymer that contained combined units that may be represented by the structural formula:

$$BO_3{}^{3(-)}[{}^{(+)}H_3N(CH_2)_4Si(CH_3)O]_3$$

Example XII

To a 100 cc. beaker were added 50 grams of trimethylsiloxy end-blocked copolymer (a silicone oil that contained 0.038 gram atom of N) that contained 10 parts by weight of combined delta-aminobutylmethylsiloxane units and 90 parts by weight of combined dimethylsiloxane units per 100 parts by weight of the combined delta-aminobutylmethylsiloxane units and combined dimethylsiloxane units. Pentachlorophenol (9.7 grams, 0.036 mole) was then added to the beaker and the mixture so formed was stirred and heated until the pentachlorophenol had dissolved in the copolymer. The product so produced was a salt that contained combined units that may be represented by the structural formula:

$$Cl_5C_6O^{(-)(+)}H_3N(CH_2)_4Si(CH_3)O$$

combined trimethylsiloxane units and combined dimethylsiloxane units. This salt was a viscous liquid that had a refractive index $[n_D{}^{25}]$ of 1.4371 and that had the following elementary analysis:

Found (percent by wt.): Cl, 10.9. Calculated (percent by wt.): Cl, 10.5.

Example XIII

The salt produced in the above example was tested as a lubricant for steel-on-steel in a test that included applying a 100 lb. break-in load for one minute, followed by continuous loading to failure. The salt failed at a loading of 400 p.s.i., while a similarly tested homopolymer (a silicone oil) that consisted of combined dimethylsiloxane units and combined trimethylsiloxane units failed at a loading of less than 100 p.s.i.

Example XIV

An aqueous solution consisting of 0.71 part by weight of gamma-aminopropyltriethoxysilane, 0.0135 part by weight of triethylamine an 14.25 parts by weight of water was slowly added to a solution of 0.7 part by weight of 2,4-dihydroxybenzophenone-4'-sulfonic acid that was dissolved in 14.25 parts by weight of water. The addition was made at 25° C. A clear, yellow solution was produced. The solution contained a salt that may be represented by the structural formula:

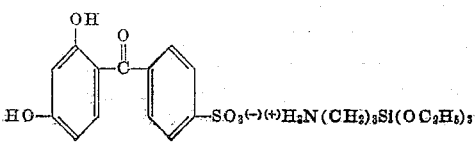

The clear, yellow solution produced above was diluted with water to a total volume of 60 milliliters. The solution so produced was heated to about 75° C. and a glass slide which had been washed in hydrochloric acid and then rinsed with distilled water was immersed in the hot solution for 2 minutes. The slide was then removed from the hot solution, air-dried and finally heated at 250° C. for 15 minutes. A slightly yellow, clear film of 14 microns' thickness was formed on the slide. This slide is designated hereinafter as slide A.

The diluted solution that was used to coat slide A was further diluted to a total volume of 120 milliliters. This latter solution was used to coat another glass slide by the same procedure used to coat slide A. A film of 12 microns' thickness was produced on the second slide and the second slide is hereinafter designated as slide B.

The percent transmission of ultra violet light of both of the above-mentioned coated slides was found to be as follows:

| Wavelength, Angstrom Units | Percent Transmission | |
|---|---|---|
| | Slide A | Slide B |
| 3,100 | 1.0 | 4.0 |
| 3,200 | 1.0 | 14.0 |
| 3,300 | 4.0 | 28.0 |
| 3,400 | 10.5 | 34.0 |
| 3,500 | 15.5 | 34.0 |
| 3,600 | 15.5 | 31.5 |
| 3,700 | 13.0 | 31.0 |
| 3,800 | 11.5 | 32.5 |
| 3,900 | 13.0 | |

Example XV

Delta-aminobutylmethyldiethoxysilane and 2,4-dihydroxybenzophenone-4'-sulfonic acid were reacted to form a salt using the procedure described in Example XIV. A salt that may be represented by the following structural formula was produced:

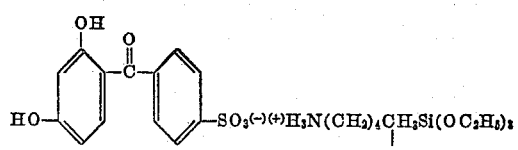

A water solution of the salt so produced was used to form a coating of 4 microns' thickness on a glass slide by immersing a glass slide that had been cleaned as described in Example XIV in the solution which was at a temperature of 85° C. The coated glass slide was found to absorb ultra violet light.

Example XVI

Twenty grams of a copolymer that contained 5 parts by weight of combined gamma-aminopropylmethylsiloxane units per 100 parts by weight of the copolymer were placed in a 150 milliliter beaker. The copolymer was a silicone oil that contained mostly combined dimethylsiloxane units in addition to the combined gamma-aminopropylmethylsiloxane units and at an average molecular weight of about 5000. Two and forty-seven hundredths grams of 2,4-dihydroxybenzophenone-4'-sulfonic acid were slowly added to the beaker. During the addition the contents of the beaker were continuously stirred and were maintained at a temperature of 25° C. During the addition the silicone oil became light yellow in color. The contents of the beaker became very viscous and the viscosity of the contents of the beaker was decreased by adding 20 milliliters of toluene to the beaker and stirring the contents. A clear, light yellow solution was produced and filtered and the filtrate so obtained was concentrated under reduced pressure. A light yellow viscous residue that weighed 18 grams was obtained. This residue contained a salt that can be represented by the structural formula:

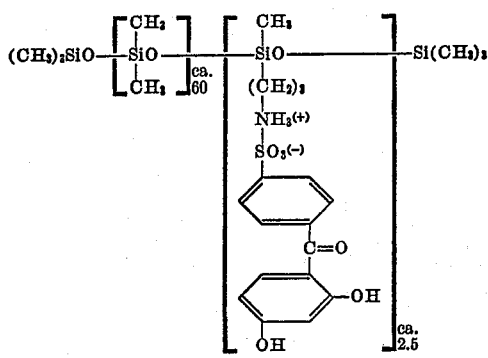

What is claimed is:

1. A solid elastomeric organopolysiloxane copolymer having good tensile strength and having (A) recurring units represented by the formula:

wherein E is a polyfunctional anion of an acid selected from the group consisting of:
(1) boric acid;
(2) saturated dicarboxylic aliphatic acids that contain from 3 to 10 carbon atoms per molecule; and
(3) olefinically unsaturated dicarboxylic acids that contain from 4 to 10 carbon atoms per molecule:

($n$) is an integer that represents the valence of the anion; ($a$) is an integer that has a value of at least 3; and R″ is a member selected from the group consisting of the alkyl groups, aryl groups and the aralkyl groups; and (B) any remaining recurring units are represented by the formula:

wherein R″ is a member selected from the group consisting of the alkyl groups, aryl groups, and aralkyl groups.

2. A solid elastomeric organopolysiloxane copolymer having good tensile strength and having (A) recurring units represented by the formula:

wherein E is a polyfunctional anion of a saturated dicarboxylic aliphatic acid that contains from 3 to 10 carbon atoms; $n$ is an integer that represents the valence of the anion; $a$ is an integer that has a value from 3 to 4; and R is a member selected from the group consisting of the alkyl groups, aryl groups and aralkyl groups and (B) any remaining recurring units are represented by the formula:

wherein R″ is a member selected from the group consisting of the alkyl, aryl groups and aralkyl groups.

3. A solid elastomeric organopolysiloxane copolymer having good tensile strength and having (A) recurring units represented by the formula:

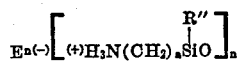

wherein E is a polyfunctional anion of an olefinically unsaturated dicarboxylic acid that contains from 4 to 10 carbon atoms per molecule; $n$ is an integer that represents the valence of the anion; $a$ is an integer that has a value from 3 to 4; and R is a member selected from the group consisting of the alkyl groups, aryl groups and aralkyl groups and (B) any remaining recurring units are represented by the formula:

wherein R″ is a member selected from the group consisting of the alkyl, aryl groups and aralkyl groups.

4. A solid elastomeric organopolysiloxane copolymer having good tensile strength and having (A) recurring units represented by the formula:

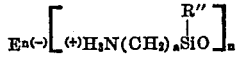

wherein E is a polyfunctional anion of boric acid; $n$ is an integer that represents the valence of the anion; $a$ is an integer that has a value from 3 to 4; and R is a member selected from the group consisting of the alkyl groups, aryl groups and aralkyl groups and (B) any remaining recurring units are represented by the formula:

wherein R″ is a member selected from the group consisting of the alkyl, aryl groups and aralkyl groups.

5. A solid elastomeric organopolysiloxane copolymer having good tensile strength and consisting of (A) recurring units having the formula:

$$[BO_3{}^{3(-)}((^+)H_3N(CH_2)_4Si(CH_3)O)_3]$$

and (B) recurring dimethylsiloxy units.

6. A solid elastomeric organopolysiloxane copolymer having good tensile strength and consisting of (A) recurring units having the formula:

$$[OOC(CH_2)_4COO]^{2(-)}[(^+)H_3N(CH_2)_4Si(CH_3)O]_2$$

and (B) recurring dimethylsiloxy units.

References Cited in the file of this patent

UNITED STATES PATENTS

| | | |
|---|---|---|
| 2,557,802 | Sommer | June 19, 1951 |
| 2,557,803 | Sommer | June 19, 1951 |
| 2,715,133 | Speier | Aug. 9, 1955 |
| 2,738,357 | Speier | Mar. 13, 1956 |
| 2,754,311 | Elliott | July 10, 1956 |
| 2,762,823 | Speier | Sept. 11, 1956 |
| 2,832,754 | Jex et al. | Apr. 29, 958 |

FOREIGN PATENTS

| | | |
|---|---|---|
| 1,065,545 | France | Jan. 18, 1954 |

OTHER REFERENCES

Sommer et al.: Jr. American Chem. Soc., vol. 73 (1951), pp. 5130–4.

Speier et al.: Journ. Am. Chem. Soc., vol. 78 (May 20, 1956), pp. 2278–81, pp. 2280–81.